United States Patent

Kinnersly

[15] 3,641,990
[45] Feb. 15, 1972

[54] INTERNAL COMBUSTION ENGINE

[72] Inventor: Richard Furneaux Kinnersly, Chapmans Farm, West Wellow, near Romsey, England

[22] Filed: Feb. 20, 1970

[21] Appl. No.: 13,046

[30] Foreign Application Priority Data

Feb. 21, 1969  Great Britain..........................9,612/69

[52] U.S. Cl. ............................123/196 R, 184/6.5, 308/23
[51] Int. Cl..........................................................F01m 1/00
[58] Field of Search ........................184/6.5, 6.6, 6.8, 6.7, 6 R, 184/18, 24; 123/41.16, 41.38, 196; 417/372; 92/153, 157; 308/167, 23

[56] References Cited

UNITED STATES PATENTS

| | | | |
|---|---|---|---|
| 557,496 | 3/1896 | Duryea | 123/196 X |
| 1,346,116 | 7/1920 | DeWaters | 184/6.8 |
| 2,852,097 | 9/1958 | Proctor | 184/18 |
| 2,902,987 | 9/1959 | Schweitzer et al. | 123/41.16 |
| 1,391,734 | 9/1921 | Heisten | 123/196 X |
| 3,006,698 | 10/1961 | Dilworth | 308/23 |
| 2,746,429 | 5/1956 | Vann | 308/23 |

Primary Examiner—Manuel A. Antonakas
Attorney—Holcombe, Wetherill & Brisebois

[57] ABSTRACT

An internal combustion engine, either two-stroke or four-stroke, having sealed lubricant chambers at the locations of at least the crankshaft and the crankpin and/or the gudgeon pin. Where practical, certain bearing surfaces of the engine may comprise dry lubricating material.

9 Claims, 3 Drawing Figures

INTERNAL COMBUSTION ENGINE

This invention relates to internal combustion engines, for example two-stroke and four-stroke internal combustion engines. It is a feature of the invention that no free lubricant is used either by admixture with the fuel, or by metered introduction from a separate supply, or any external system whatsoever.

According to the present invention there is provided an internal combustion engine having sealed lubricant chambers at the locations of at least the crankshaft and the crankpin.

Figure 1:
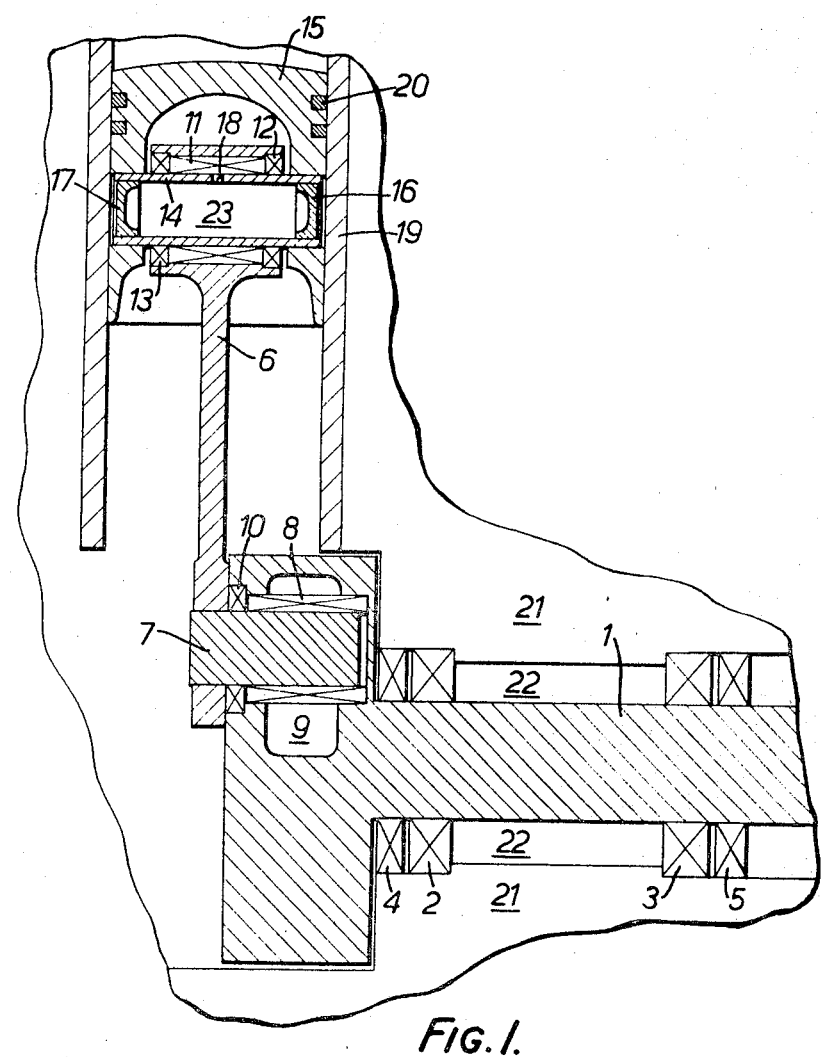
Figure 2:
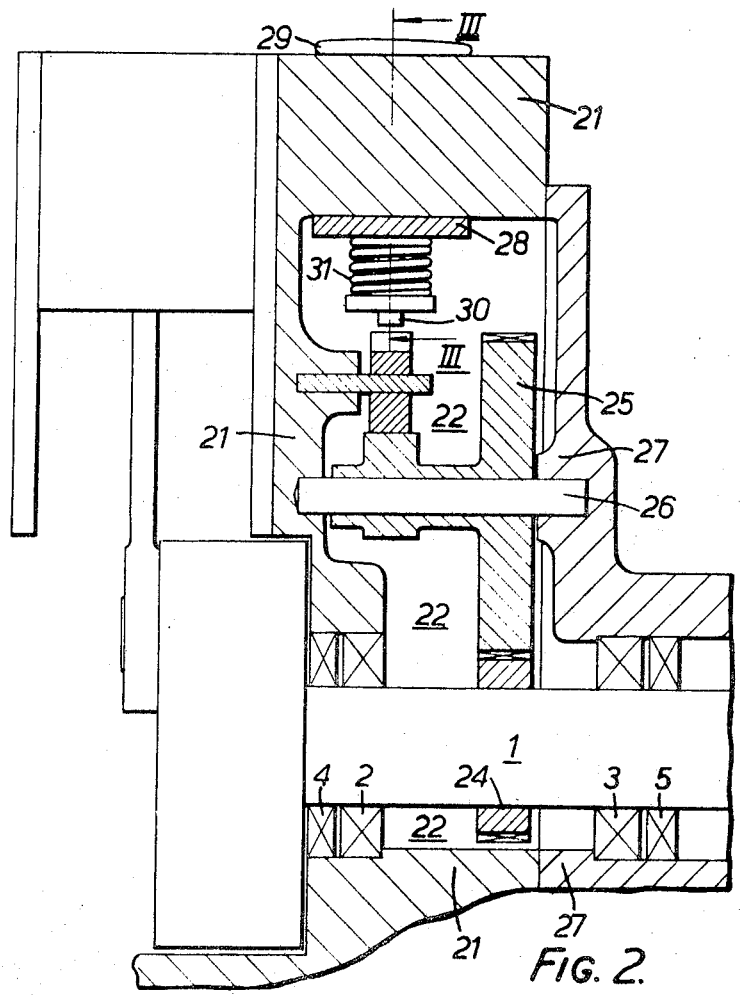
Figure 3:
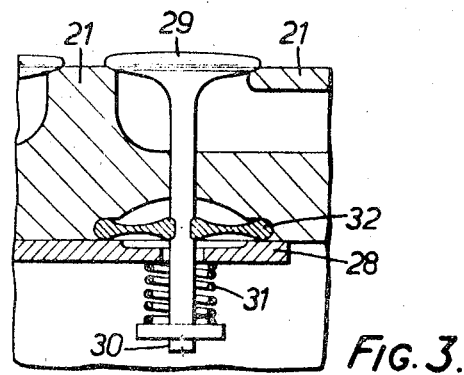

The present invention will be more readily understood from the following description, given by way of example only, reference being had to the accompanying drawings in which:

FIGS. 1 and 2 are sectional elevation views of a two-stroke and four-stroke engine respectively, and FIG. 3 is a scrap sectional view taken on line III—III of FIG. 2 and shows a valve assembly.

Turning to FIG. 1 of the drawings, a cantilever or overhung crankshaft 1 is supported by a pair of rolling element bearings 2 and 3, enclosed at either end by seals 4 and 5. The bearing 2 and seal 4 may be an integral unit as may the bearing 3 and seal 5. Between the bearing-seal combinations 2, 4 and 3, 5, the shaft 1 and the engine housing 21 there is formed an annular chamber 22 which is filled with lubricant at the time of engine manufacture or assembly.

The connecting rod 6 at its lower end has an interference fit with, or is integral with, a crankpin 7 which is free to rotate in a bearing 8 mounted in the crankweb. The crankpin 7 is interference-fitted to the inner component of the rolling element 8 which is a combined needle roller and ball race whose outer member is in turn interference fitted to the crankweb of crankshaft 1 so as to control the axial location of crankpin 7.

The bearing 8 is in communication with a lubricant chamber 9 situated within the crankweb, the chamber 9 surrounding the bearing 8.

The lubricant stored on manufacture or assembly in said chamber 9 is prevented from escape by a seal 10 acting upon the crankpin 7 and mounted in the crankweb between the connecting rod 6 and the bearing 8.

At the upper end of the connecting rod 6 is housed a rolling element needle roller bearing 11 and on either side of said bearing are seals 12 and 13 mounted in the connecting rod and acting upon a gudgeon pin 14 mounted within bearing 11.

The gudgeon pin is prevented from rotating in a piston 15, which piston is the piston of the two-stroke engine, by an interference fit in the gudgeon bosses of said piston, and is hollow so as to form a lubricant storage chamber 23.

Lubricant is retained in chamber 23 by closure plugs 16 and 17 at either end of said gudgeon pin. The lubricant so contained is in communication with gudgeon pin bearing 11 via a hole or holes 18 in the wall of said gudgeon pin and is prevented from escaping past bearing 11 by seals 12 and 13.

It might prove necessary to restrain excessive lubricant movement due to inertial or centrifugal forces acting upon said quantities of stored lubricant in chambers 9, 22 and 23 which will be filled during manufacture or assembly so as to prevent the lubricant in those chambers from generating excessive hydrodynamic pressures which might damage the retaining seals 4, 5, 10, 12 and 13. Such excessive movement of the lubricant can be controlled by suspending or dispersing the lubricant in a suitable porous medium capable of limiting such motion.

The piston 15 is constructed of, or coated with, such a material or materials, metallic or otherwise, as set out in the following list of dry self-lubricating materials and as prove capable of operating in a compatible cylinder bore 19:

Steel
Aluminum
Nickel
Copper
Tungsten
Tantalum
Molybdenum
Chromium
Platinum
Tin
Bronze
Silver
Lead
Inidium
Nickel chrome boron
Nickel chrome boron silicon
Nickel chrome cobalt
Alumina Titania
Titanium Dioxide
Alumina
Chromium Oxide
Alumina Titanium Dioxide
Zirconia
Hafnium 3
Magnesium Zirconate
Calcium Zirconate
Zirconium Silicate
Barium Titanate
Nickel Oxide
Sintered Iron
Sintered Bronze
Carbon ceramic
Molybdenum Disilicide
Magnesia Alumina Spinel
Chromium Silicide
Aluminum Silicate
Colombium
Titanium Hydride
Hexaboron Silicide
Yttrium Zirconate
Tungsten Carbide
Chromium Carbide
Tungsten Carbide Cobalt
Chromium Carbide Cobalt
Nickel Aluminide
Nickel Aluminide Alumina
Nickel Aluminide Zirconia
Pyrosil glass
Glass
Polytetraflouroethylene The materials in the above list are given by way of example only.

The bore 19 is also constructed of, or coated with, such materials or combination of materials from the above list as prove capable of operating without free lubricant other than that present as condensates or vapors of the fuel or of the combustion process.

The piston rings 20 are also constructed of such material or materials, metallic or otherwise, from the above list as prove capable of compatible operation in said piston 15 and cylinder bore 19 without need of external or free lubricant.

The internal geometry of the engine two-stroke or four-stroke is so constructed as to reduce piston side thrust loads and rubbing or rolling speeds of the bearings and seals where necessary. Also, the piston ring or rings is or are so positioned axially as to minimize thermal stress on said ring or rings if this should prove critical.

There has been described a two-stroke internal combustion engine having sealed lubricant chambers at the following locations:

a. the connection between the connecting rod 6 and the gudgeon pin 14;
b. the connection between the crankpin 7 and the crankshaft 1, and
c. the location of the bearings for the crankshaft 1.

As indicated, the invention is not limited to a two-stroke engine and can be applied to a four-stroke engine. The invention contemplates sealed lubricant chambers like those previously described and illustrated at locations in a four-stroke engine corresponding to the above locations a, b and c in a two-stroke engine.

The list of materials given above in relation to the piston, piston rings and piston cylinder wall of a two-stroke engine is also applicable to the corresponding parts of a four-stroke engine and also such additional parts particular to a four-stroke engine, which in order to operate without free lubricant require application of one or more of the above materials to their bearing surfaces. Thus, the pistons, piston rings, piston cylinder walls and such additional parts as are relevant to the four-stroke engine, may comprise any one of the materials included in the said list, either alone or in combination with one or more of the other materials in said list, as a blend or alloy or composite mixture achieved by and applied to the respective bearing surfaces by any process which is satisfactory.

A four-stroke engine incorporating the invention is illustrated in FIGS. 2 and 3 in which a side valve engine is shown only by way of example. It is understood that the invention also applies to the overhead valve type of four-stroke engine.

In the engine of FIGS. 2 and 3, there are sealed lubricant chambers at locations corresponding to the said locations a, b and c, referred to in connection with the two-stroke engine. The relevant piston and piston ring details may be identical with those same assemblies shown in FIG. 1; these are not sectioned in FIG. 2 but are shown solid for clarity. The chamber 22 of the engine of FIGS. 2 and 3 is different from the chamber 22 of FIG. 1 as will be described hereinafter.

The said lubricant chamber 22 of FIG. 2 is extended upwards to accommodate a camshaft and camshaft driving gear 25 mounted on bearing shaft 26 and driven by a gear 24 mounted on the crankshaft 1. The enlarged chamber so formed also contains the complete valve-actuating mechanism; details of the valve retaining or actuating components or mechanism which are not relevant to the invention have not been described or shown in full on FIGS. 2 and 3. The details relevant to the invention concerning the valve stem seals are common to both valve assemblies in the four-stroke engine; therefore one valve assembly only is shown in FIG. 3.

The said enlarged chamber 22 is closed by a cover plate 27 in which bearing 3 and seal 5 are now mounted, these components having previously been mounted common to bearing 2 and seal 4 in engine main casing 21.

With the exception of the bearing regions formed between valve stem 30 and the valve stem bore, and the valve head seal face and the valve head seat situated in engine casing 21, all the moving parts of the valve-operating mechanism are situated within chamber 22 and are therefore lubricated by the lubricant stored within this chamber.

This said lubricant is prevented from escape at the point where the valve stem passes through casing 21 by a flexible circular membrane 32 which is centrally apertured and "snap-fitted" into a circumferential groove in the valve stem 30. The outer circular rim of seal 32 is anchored by a plate 28 which deforms said outer rim into an annular groove concentric with the valve stem in casing 21. The outer rim of seal 32 is deeper than the annular recess in casing 21; the plate 28, which is loaded by the compression of the valve spring 31 on to its lower face causes seal 32 to be impermeably anchored between casing 21 and the plate 28.

The bearing surfaces formed between valve stem 30 and the valve stem bore in casing 21 are, in respect of said valve stem, covered or coated, and in respect of said valve stem bore, lined or bushed with a material or materials from the above list which enables the said bearing location to operate without free lubricant.

If desired, an alternative sealing arrangement is possible for the valve stem in which arrangement a seal normally described as a "garter seal" is housed in casing 21 and prevents the escape of lubricant by exerting a wiping action on valve stem 30.

It is also suggested that if required the valve head seal face and the corresponding valve head seat in casing 21 be lined or coated as suitable with a material or materials from the above list of materials.

It is also intended to eliminate one or more of the lubricant chambers, and adjacent seals where practicable, in either the two- or four-stroke engine embodiment of this invention should any of the materials or blend of materials in the above list prove capable of sustaining the loads involved in these bearing locations. It may be possible to eliminate that portion of chamber 22 of the four-stroke engine embodiment which chamber portion contains the valve-actuating mechanism, should it prove possible to operate all the valve-actuating mechanism without the lubricant formerly stored in that chamber portion by the use of one or more of the materials in the above list of material. Likewise, it may be possible to eliminate the chamber 23.

Similarly, where possible, plain bearings of a material from the above list may be employed in place of the rolling element bearing or bearings associated with any sealed lubricant chamber of the two- and four-stroke engines. In this case, the plain bearing or bearings will be lubricated by the existing lubricant chamber(s) and seal assembly or assemblies as employed for the respective rolling element bearings.

The present invention can be embodied in an engine, either two- or four-stroke, having one or more than one engine cylinder.

It will be appreciated that no lubricant is consumed during the running of the two- or four-stroke engine as disclosed herein. The lubricant chambers will remain sealed during the whole life of the engines. Those parts of the engines which require it will be provided with exactly the right amount of lubricant before the engines leave the factory and user will not have to add lubricant to the engines or drain lubricant from the engines. Because the engines will always contain exactly the right amount of lubricant, they will be more economic to run than known engines which require frequent supervision and "topping up." The absence of any possibility of user error makes for greater reliability in use.

In the two-stroke engine embodiment and also in the four-stroke engine embodiment connecting rod 6 is fast with the crankpin 7 by way of an interference fit or an integral connection. The advantages of this arrangement are: (a) it makes use of the naturally available space within the crankweb which space is not practicably available in the confines or dimensions of the connecting rod crankpin bearing assembly whereby a chamber of adequate volume can be constructed to hold sufficient lubricant for the intended life of the engine; (b) the construction permits the use of one lubricant-restraining seal only (seal 10). If the crankpin (7) were rotatable in a bearing in the connecting rod (6), two lubricant seals for that bearing would have to be used one on each side of the connecting rod; (c) the bearing or bearings (8) is or are located within the crankweb, not the connecting rod, with the result that the width of the lower end of the connecting rod can be kept to a minimum in order to reduce load movement upon the crankshaft main bearings (2 and 3).

I claim:

1. In a reciprocating piston engine comprising a cylinder, a piston mounted for reciprocating sliding movement within said cylinder, a reciprocating connecting rod rotatably connected with said piston, a crankshaft, a crankpin rotatably connecting said connecting rod with a crankweb of said crankshaft, a housing, said crankshaft being rotatably mounted in said housing, the improvement comprising:
   a. a first lubricant storage chamber extending about said crankshaft and defined between said crankshaft and said housing,
   b. first bearing means rotatably mounting said crankshaft in said housing and located in said first lubricant storage chamber,
   c. lubricant prestored in said first lubricant storage chamber and in direct contact with said first bearing means to permanently lubricate said first bearing means,
   d. means sealing the ends of said first lubricant storage chamber to retain said lubricant permanently therein, e. a second lubricant storage chamber extending about said crankpin and defined between said crankpin and a member rotatable with respect to said crankpin,
f. second bearing means mounting said crankpin for rotation in said member and located in said lubricant storage chamber,
g. lubricant prestored in said second lubricant storage chamber and in direct contact with said second bearing means to permanently lubricate said second bearing means, and
h. means sealing the ends of said second lubricant storage chamber to permanently retain said lubricant therein.

2. In a reciprocating piston engine as set forth in claim 1, further comprising a gudgeon pin rotatably connecting said connecting rod with said piston, and third bearing means mounting said connecting rod for rotation about said gudgeon pin, the improvement according to which said third bearing means is mounted in an annular chamber defined about said gudgeon pin and in said connecting rod, and said engine comprises:
a. a third lubricant storage chamber defined internally of said gudgeon pin,
b. lubricant prestored in said lubricant storage chamber,
c. port means defining direct communication between said third lubricant storage chamber and said annular chamber so that said third bearing means is in direct communication with said lubricant to be permanently lubricated thereby,
d. means sealing the ends of said third lubricant storage chamber to retain said lubricant permanently therein, and
e. means sealing the ends of said annular chamber to prevent the escape of said lubricant therefrom.

3. In a reciprocating piston engine as set forth in claim 1, further comprising a valve mounted for reciprocating movement relative a valve seat, and valve-actuating mechanism for actuating said valve in timed relation to movement of said piston in said cylinder thereby to control charging and exhaust of said cylinder, the improvement according to which:
a. said valve has its stem extending into said first lubricant storage chamber,
b. said valve-actuating mechanism is located in said first lubricant storage chamber in direct contact with said lubricant stored therein thereby to be permanently lubricated thereby.

4. In a reciprocating piston engine as set forth in claim 2, further comprising a valve mounted for reciprocating movement relative a valve seat, and valve-actuating mechanism for actuating said valve in timed relation to movement of said piston in said cylinder thereby to control charging and exhaust of said cylinder, the improvement according to which:
a. said valve has its stem extending into said first lubricant storage chamber,
b. said valve-actuating mechanism is located in said first lubricant storage chamber in direct contact with said lubricant stored therein thereby to be permanently lubricated thereby,
c. and said engine comprises means sealing about said stem to prevent the escape therepast of lubricant from said first lubricant storage chamber.

5. In a reciprocating piston engine as set forth in claim 1, further comprising a reciprocating valve for controlling flow through an inlet or exhaust port of said cylinder, and valve-actuating mechanism for said valve, the improvement comprising a sealed lubricant storage chamber in which said valve-actuating mechanism is located and in which lubricant is prestored and permanently retained therein in direct contact with said mechanism to permanently lubricate said mechanism.

6. In a reciprocating piston engine as set forth in claim 2, further comprising a reciprocating valve for controlling flow through an inlet or exhaust port of said cylinder, and valve-actuating mechanism for said valve, the improvement comprising a sealed lubricant storage chamber in which said valve-actuating mechanism is located and in which lubricant is prestored and permanently retained therein in direct contact with said mechanism to permanently lubricate said mechanism.

7. A reciprocating piston engine as set forth in claim 4, wherein the running surfaces between said piston and said cylinder are of a material capable or running without lubrication.

8. A reciprocating piston engine as set forth in claim 6, wherein the running surfaces between said piston and said cylinder are of a material capable of running without lubrication.

9. In a reciprocating piston engine as set forth in claim 4, the improvement according to which:
a. said valve-actuating mechanism comprise
  1. first gear means rotatably fast with said crankshaft,
  2. second gear means in drivable connection with said first gear means, and
  3. cam means rotatably driven by said second gear means and adapted to impart reciprocating motion to said valve stem,
b. said housing comprises a first housing part and a cover plate therefor between which said first lubricant storage chamber is defined, and
c. said second gear means is rotatably mounted between said first housing part and said cover plate by shaft means bearing therein.

* * * * *